US009134523B2

(12) United States Patent
Wu

(10) Patent No.: US 9,134,523 B2
(45) Date of Patent: Sep. 15, 2015

(54) PREDICTIVE FOCUSING FOR IMAGE SCANNING SYSTEMS

(71) Applicant: Hong Kong Applied Science and Technology Research Institute Company Limited, Hong Kong (HK)

(72) Inventor: Xiaohua Wu, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 320 days.

(21) Appl. No.: 13/945,910

(22) Filed: Jul. 19, 2013

(65) Prior Publication Data
US 2015/0022651 A1 Jan. 22, 2015

(51) Int. Cl.
*G02B 21/36* (2006.01)
*G02B 21/02* (2006.01)

(52) U.S. Cl.
CPC ............ *G02B 21/361* (2013.01); *G02B 21/025* (2013.01)

(58) Field of Classification Search
CPC .... G02B 27/46; G02B 21/024; G02B 21/025; G02B 21/36
See application file for complete search history.

(56) References Cited

U.S. PATENT DOCUMENTS

| 7,232,980 | B2 | 6/2007 | Oshiro et al. |
| 2005/0089208 | A1 | 4/2005 | Dong et al. |
| 2006/0226341 | A1* | 10/2006 | Washisu ..................... 250/208.1 |

FOREIGN PATENT DOCUMENTS

| EP | 2390706 A1 | 11/2011 |
| WO | WO2011080670 A1 | 7/2011 |

* cited by examiner

Primary Examiner — Anner Holder
Assistant Examiner — Zhubing Ren
(74) Attorney, Agent, or Firm — Ella Cheong Hong Kong; Sam T. Yip

(57) ABSTRACT

This invention discloses an apparatus for achieving predictive focusing in an image scanning system. The apparatus comprises an optical path-length changing plate and an image sensor. In one embodiment, the plate comprises a plurality of path-length changing members. The plate further includes a central region configured to provide a substantially constant change in optical path length across the central region, allowing an image passing therethrough to be in-focus captured. Having a light receiving surface, each path-length changing member is configured to provide a substantially non-uniform change in optical path length across the light receiving surface, allowing a focus plane of the image to be tilted such that the image projected onto the imaging sensor can be used for predicting an amount of optical adjustment required to achieve focusing. By using more than one path-length changing member, predictive focusing is achievable with more than one direction of focus-plane tilting.

20 Claims, 11 Drawing Sheets

PREDICTIVE FOCUSING FOR IMAGE SCANNING SYSTEMS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to an apparatus for achieving predictive focusing in an image scanning system. The image scanning system, such as a microscope system, is configured to raster-scan a sample where the sample is partitioned into an array of fields of view.

BACKGROUND

In some practical imaging applications, it is desired to scan a sample by partitioning the sample into an array of fields of view (FoVs) and scanning the array of FoVs in a raster-scanning manner. Before an image appeared on one FoV is captured, focusing is performed in order to bring this image in-focused. That is, focusing is individually applied to each of the FoVs. One example of such practical imaging applications is related to clinical pathology. A pathology slide with tissue or cells for scanning and examination typically has an area of 5 cm by 2 cm while a FoV that can be imaged by a microscope is around 1 mm in diameter. Since high-resolution images are required to reveal fine details of tissue and cells high-magnifying objective lenses are used. These lenses have very shallow depths of view so that a slight sample-surface roughness or stage tilt can lead to image blurring. Thus, focusing is required for each FoV. Another example of such practical imaging applications is related to imaging semiconductor dice on a wafer with a high degree of magnification in order to reveal small features on each semiconductor die.

EP2390706 and U.S. Pat. No. 7,232,980 suggest an image scanning system using a dedicated autofocus imaging sensor, separate from a primary imaging sensor, for achieving focusing of the FoVs. The presence of the separate, dedicated autofocus imaging sensor is contributory to enable the image scanning system to achieve high-speed scanning. For the purpose of determining how much optical adjustment for achieving focusing, the dedicated autofocus imaging sensor is tilted so that this autofocus imaging sensor is not positioned perpendicular to an optical axis of the image scanning system. U.S. Pat. No. 7,232,980 further suggests an alternative implementation of the image scanning system in which the dedicated autofocus imaging sensor can be positioned perpendicular to the optical axis provided that an optical path-length changing member is put in front of the autofocus imaging sensor. The optical path-length changing member effectively rotates the focus plane of an image that passes therethrough, thereby introducing an effect substantially similar to an effect of tilting the autofocus imaging sensor for achieving focusing.

In the disclosure of EP2390706 and U.S. Pat. No. 7,232,980, however, the autofocus imaging sensor can only be physically tilted in one direction or the optical path-length changing member can rotate the focus plane in one direction only. To achieve focusing with improved accuracy or greater reliability, it is advantageous if multiple directions are involved in performing focusing. Providing multiple directions is achievable by using multiple autofocus imaging sensors or using multiple optical devices each of which is a cascade of an optical path-length changing member and an autofocus imaging sensor. However, the implementation cost is inevitably increased.

It is desirable if a single autofocus imaging sensor is used while multiple directions are provided. Since high-speed scanning of FoVs is desirable for many imaging applications, predictive focusing can be advantageously employed in high-speed image scanning systems to ensure that high-sharpness images can be obtained in such high-speed systems. There is a need in the art for an apparatus that employs a single autofocus imaging sensor but provides multiple directions for achieving predictive focusing in an image scanning system. An example of the image scanning system is a microscope system.

SUMMARY OF THE INVENTION

The present invention discloses an apparatus for achieving predictive focusing in an image scanning system. The image scanning system is configured to scan a sample by partitioning the sample into an array of FoVs where focusing is individually applied to each of the FoVs and where the array of FoVs, arranged as rows of FoVs, is scanned in a raster-scanning manner.

The predictive-focusing apparatus comprises an optical path-length changing plate and an imaging sensor both positioned substantially perpendicular to an optical axis of the image scanning system. For the optical path-length changing plate, an individual light beam that travels therethrough in a direction along the optical axis experiences a change in optical path length introduced by the plate. The imaging sensor is for sensing an image formed by light beams after such light beams travel through the plate. The optical path-length changing plate comprises a plurality of path-length changing members on the plate.

The path-length changing members are positioned substantially away from the plate's center so as to form a central region of the plate.

Each of the path-length changing members has a light receiving surface, and is configured to provide a substantially non-uniform change in optical path length across the light receiving surface when first plural light beams travel into the light receiving surface in a direction along the optical axis. Each path-length changing member is further configured such that a focus plane of a first image formed by the first plural light beams is rotated with an inclination angle relative to the imaging sensor. Furthermore, the focus plane of the first image is rotated around either a first reference axis orthogonal to the optical axis or a second reference axis orthogonal to both the optical axis and the first reference axis. A first projected image formed by the first plural light beams and projected onto the imaging sensor is thereby allowed to be used for predicting an amount of optical adjustment required to achieve focusing.

The central region and the path-length changing members are positioned on the plate and configured such that: an image appeared on a first FoV, the first FoV being one of the FoVs on the sample, is received by the central region; and an image appeared on a second FoV adjacent to the first FoV on the sample is received by the light receiving surface of one of the path-length changing members. When the image appeared on the first FoV is captured for imaging, it is allowable that the image appeared on the second FoV after passing through the plate is substantially simultaneously captured by the imaging sensor for predicting an amount of optical adjustment required to be made for achieving focusing on the image appeared on the second FoV.

Optionally, the central region is configured to provide a substantially constant change in optical path length across the central region when second plural light beams travel into the central region in a direction along the optical axis. The central region is additionally configured such that a second image formed by the second plural light beams has a focus plane that is optically adjustable by a focusing mechanism of the apparatus to coincide with the imaging sensor, thereby allowing the second image to be in-focus captured by the imaging sensor.

Preferably, at least one of the path-length changing members is configured to rotate the focus plane of the first image around the first reference axis, and at least one of the path-length changing members is configured to rotate the focus plane of the first image around the second reference axis.

The apparatus may further comprise a focus controller for predicting the amount of optical adjustment required to achieve focusing according to the first projected image captured by the imaging sensor. The focusing mechanism may include an actuator for moving an objective lens in order to drive the sample to be in-focused.

Preferably, the predictive-focusing apparatus is further configured as follows. A first one of the path-length changing members, regarded as a first path-length changing member, is configured to rotate the focus plane of the first image around a first rotation axis that is either the first reference axis or the second reference axis. As a result, a first in-focus strip of the first image as captured by the imaging sensor for predicting a required amount of optical adjustment has a direction along the first rotation axis. A second one of the path-length changing members, regarded as a second path-length changing member, is configured to rotate the focus plane of the first image around a second rotation axis orthogonal to the first rotation axis. It follows that a second in-focus strip of the first image as captured by the imaging sensor for predicting a required amount of optical adjustment has a direction along the second rotation axis. The first path-length changing member is positioned adjacent to the central region such that a third FoV, an image appeared on which is received by the first path-length changing member, is one row ahead of the first FoV. The second path-length changing member is positioned adjacent to the central region such that a fourth FoV, an image appeared on which is received by the second path-length changing member, is one FoV ahead of the first FoV.

When an image appeared on a current imaging FoV passes through the central region, the following two actions are also taken. First, an amount of optical adjustment required to achieve focusing an image appeared on a FoV one row ahead of the current imaging FoV is predicted via analyzing the first in-focus strip obtained by capturing such image after passing through the first path-length changing member. Second, an already predicted amount of optical adjustment required to achieve focusing an image appeared on a FoV immediately ahead of the current imaging FoV is rechecked via analyzing the second in-focus strip obtained by capturing such image after passing through the second path-length changing member. The second in-focus strip is orthogonal in direction to the first in-focus strip.

The predictive-focusing apparatus may be further configured as follows. A third one of the path-length changing members, regarded as a third path-length changing member, is configured to rotate the focus plane of the first image around a third rotation axis that is either the first reference axis or the second reference axis. A fourth one of the path-length changing members, regarded as a fourth path-length changing member, is configured to rotate the focus plane of the first image around a fourth rotation axis orthogonal to the third rotation axis. The third path-length changing member is positioned adjacent to the central region such that a fifth FoV, an image appeared on which is received by the third path-length changing member, is one row behind the first FoV. The fourth path-length changing member is positioned adjacent to the central region such that a sixth FoV, an image appeared on which is received by the fourth path-length changing member, is one FoV behind the first FoV. As a result, prediction and rechecking are accomplishable when the sample is raster-scanned in a forward scan direction as well as when raster scanning is done in a backward scan direction.

Optionally, when the image appeared on the current imaging FoV passes through the central region, accuracy of focusing already performed on an image appeared on a FoV immediately behind the current imaging FoV is assessed via analyzing an additional in-focus strip obtained by capturing such image after passing through the fourth path-length changing member.

Optionally, the third rotation axis is the first rotation axis, and the fourth rotation axis is the second rotation axis.

Comprising the predictive-focusing apparatus as disclosed, preferably the image scanning system further comprises a primary sensor for imaging the image appeared on the current imaging FoV. The primary sensor has one or more advantages over the imaging sensor in capturing the image appeared on the current imaging FoV. Such one or more advantages include one or more of the following items: higher imaging resolution; controllable imaging resolution; higher light sensitivity; lower imaging noise level; and higher spectral sensitivity over a dedicated range of wavelengths.

The present invention also discloses an apparatus for achieving predictive focusing in an image scanning system where an optical path-length changing plate used in the image scanning system does not include a central region.

DETAILED DESCRIPTION OF THE INVENTION

Figure 1:
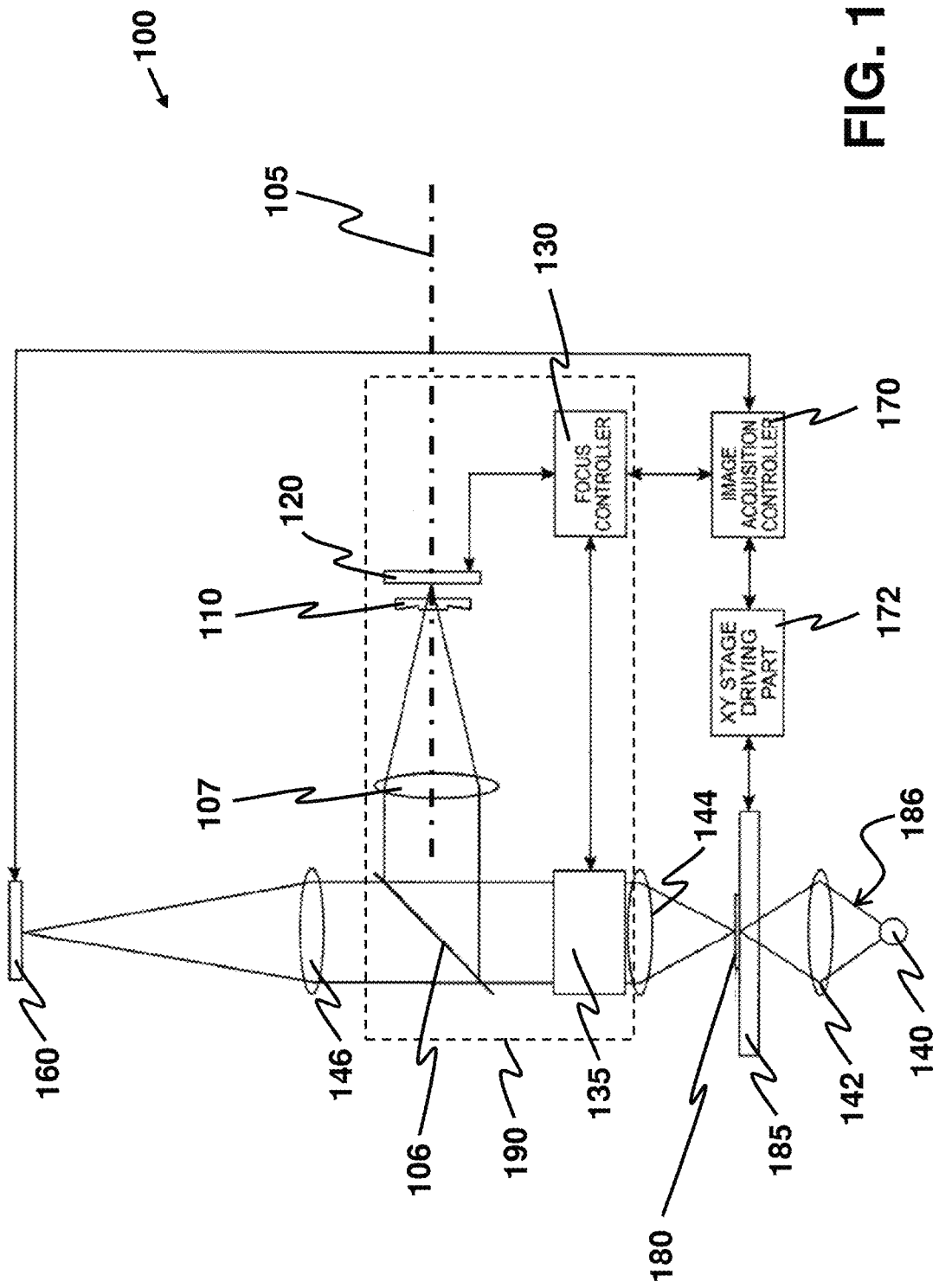
FIG. 1 depicts an image scanning system having a unit for achieving predictive focusing in accordance with an embodiment of the present invention.

An aspect of the present invention is to provide an apparatus for achieving predictive focusing in an image scanning system. The image scanning system is configured to scan a sample by partitioning the sample into an array of FoVs. Focusing is individually applied to each of the FoVs, and the array of FoVs, arranged as rows of FoVs, is scanned in a raster-scanning manner. FIG. 1 depicts an image scanning system that comprises an embodiment of the disclosed apparatus.

An image scanning system 100 is configured to scan a sample 180 that is placed on a specimen holder 185. The specimen holder 185 is driven by a holder driver 172 so as to move the sample 180 in a raster-scanning manner and allow a FoV on the sample 180 to be precisely positioned for imaging. The FoV is illuminated by a probe light beam 186 generated by using a condenser lens 142 to concentrate light beams generated from a light source 140. After passing through the FoV, the probe light beam 186 carries an image appeared on the FoV, and is processed by an objective lens 144 for magnifying this image.

The image scanning system 100 further comprises an apparatus 190 for achieving predictive focusing. The predictive-focusing apparatus 190 employs a focusing mechanism for optically adjusting the probe light beam 186 in order that the FoV on the sample 180 can be focused. As an example, the focusing mechanism may be realized by an actuator 135 for moving the objective lens 144, allowing the distance between the objective lens 144 and the sample 180 to be adjusted so as to bring the FoV of the sample 180 to be in-focused.

After the probe light beam 186 is optically adjusted by the actuator 135, a light splitter 106 directs a first part of the probe light beam 186, usually a minor part thereof, to a cascade of optical devices in the predictive-focusing apparatus 190 for predicting the amount of optical adjustment. A remaining part of the probe light beam 186, generally a major part thereof, is directed to a first relay lens 146 such that the image appeared on the FoV and carried by such remaining part of the probe light beam 186 is focused onto a primary sensor 160 for imaging.

According to an embodiment of the present invention, the predictive-focusing apparatus 190 comprises an optical path-length changing plate 110 and an imaging sensor 120 both positioned substantially perpendicular to an optical axis 105 of the image scanning system 100. The plate 110 is configured such that an individual light beam traveling through the plate 110 in a direction along the optical axis 105 experiences a change in optical path length introduced by the plate 110.

The imaging sensor 120 is used for capturing an image formed by the first part of the probe light beam 186 after such light beam travels through the plate 110. The optical axis 105 is configured to point in a direction that the first part of the probe light beam 186 travels. The first part of the probe light beam 186 passes through a second relay lens 107 for focusing the first part of the probe light beam 186 onto the imaging sensor 120.

Figure 2:
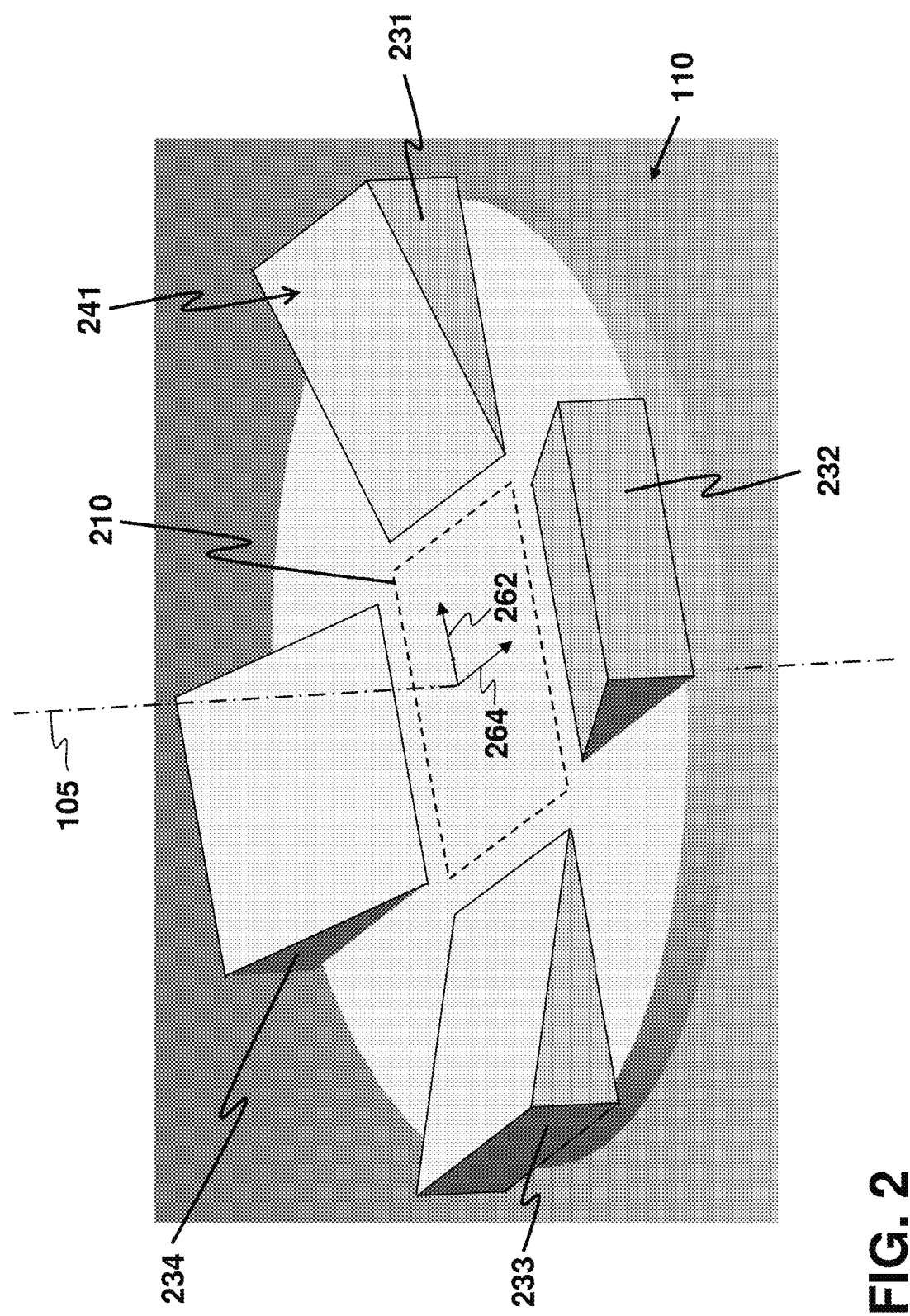
FIG. 2 depicts, according to an embodiment of the present invention, an optical path-length changing plate that provides a plurality of path-length changing members each of which inclines the focus plane with a particular direction, where the optical path-length changing plate is used in the image scanning system shown in FIG. 1.

FIG. 2 depicts the optical path-length changing plate 110 in greater detail. The optical path-length changing plate 110 comprises a plurality of path-length changing members 231-234 on the plate 110. Although FIG. 2 shows that there are four path-length changing members 231-234, the present invention is not limited to this specific number of path-length changing members. According to the present invention, and as will soon be evidenced from the description hereinafter, at least two path-length changing members are used for the optical path-length changing plate. The path-length changing members 231-234 are positioned substantially away from the plate's center so as to form a central region 210 of the plate 110.

Take a path-length changing member 231 as a representative to all of the path-length changing members 231-234 in illustration. The changing member 231 has a light receiving surface 241. In addition, the changing member 231 is configured to provide in optical path length across the light receiving surface 241 when first plural light beams travel into the light receiving surface 241 in a direction along the optical axis 105. A desired outcome of such arrangement for the changing member 231 is that a focus plane of a first image formed by the first plural light beams is rotated with an inclination angle relative to the imaging sensor 120, thereby allowing a first projected image formed by the first plural light beams and projected onto the imaging sensor 120 to be used for predicting an amount of optical adjustment required to achieve focusing. A focus controller 130 may be used for predicting this amount of optical adjustment according to said first projected image.

Figure 3:
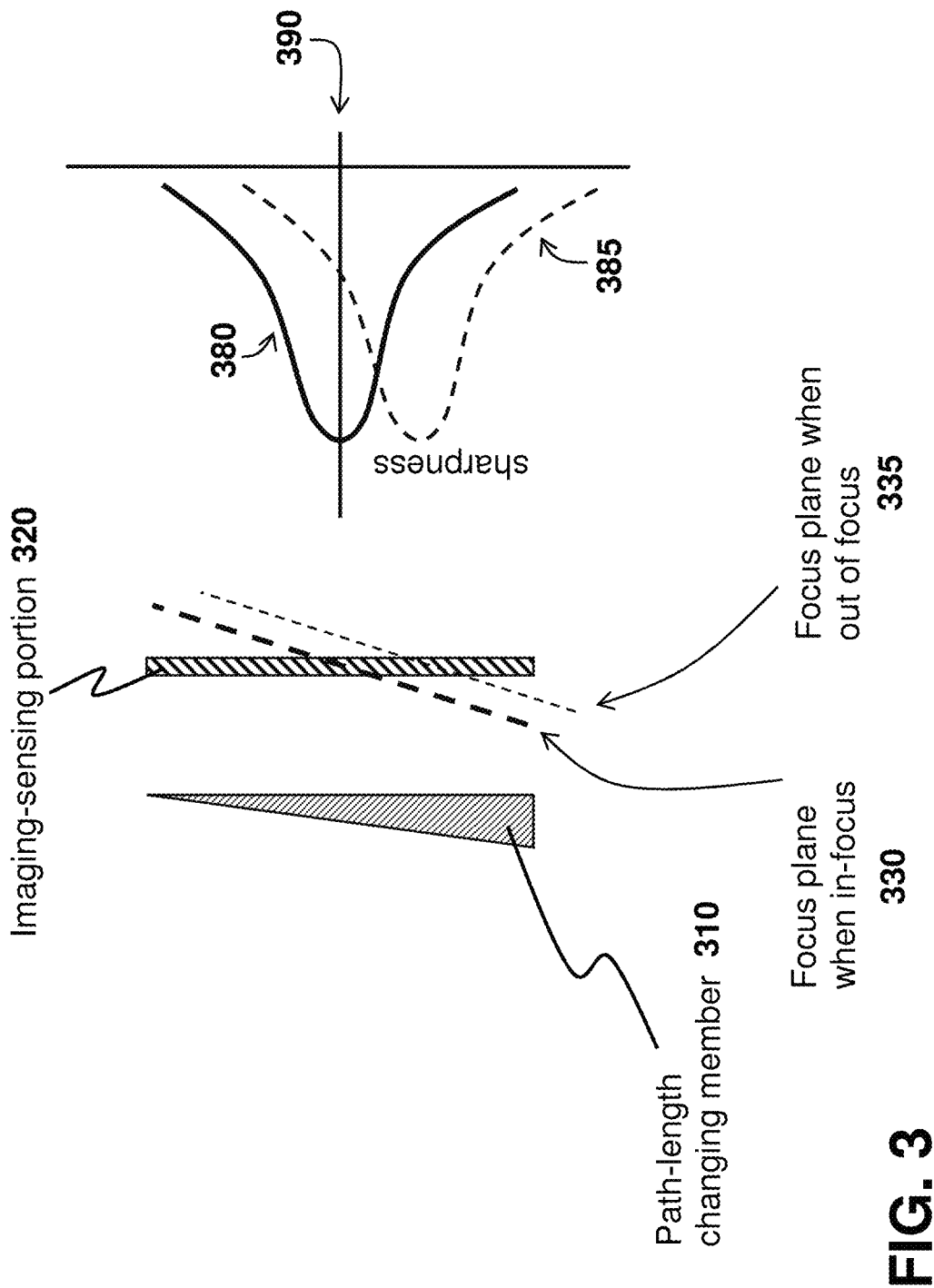
FIG. 3 illustrates that a path-length changing member and an image sensor can be used for predicting whether focusing is achievable by analyzing the position of the sharpest section in a captured image.

FIG. 3 shows that it is feasible to predict this amount of optical adjustment by having a focus plane inclined to an imaging sensor. A path-length changing member 310 is positioned in front of an imaging-sensing portion 320 of the imaging sensor 120. When an image to be captured is in-focused, the image gives rise to a first focus plane 330. Since the first focus plane 330 has an inclination angle with respect to the imaging-sensing portion 320, a resultant captured image has uneven sharpness. This unevenness is reflected in a first sharpness curve 380. As shown in the first sharpness curve 380, the position that the sharpest portion of the captured image appears is a certain reference location 390. This reference location 390 can be predicted by an ordinary person skilled in the art under an assumption that focusing is achieved. When the image to be captured is out of focus, a second focus plane 335 is obtained. The second focus plane 335 shifts away from the position of the first focus plane 330, resulting in a corresponding second sharpness curve 385 that is different from the first sharpness curve 380. The distance between the reference location 390 and the location of the highest-sharpness point shown in the second sharpness curve 385, together with the direction of shift of the highest-sharpness point, can be used to estimate the amount of optical power required to achieve focusing.

Refer to FIG. 2. For the particular path-length changing member 231, a focus plane for light beams passing therethrough is rotated around a first reference axis 264 where the first reference axis 264 is orthogonal to the optical axis 105. A focus plane for light beams passing through the path-length changing member 233 is also rotated around the first reference axis 264. Note that equivalently, the focus plane for light beams passing through either of the path-length changing members 231, 233 is tilted in a direction along a second reference axis 262. The second reference axis 262 is orthogonal to the optical axis 105. Furthermore, the first reference axis 264 and the second reference axis 262 are mutually orthogonal. In a similar way, a focus plane for light beams passing through either of the path-length changing members 232, 234 is rotated around the second reference axis 262. Equivalently, this focus plane is tilted in a direction along the first reference axis 264. To summarize, each of the path-length changing members 231-234 is rotated around either the first reference axis 264 or the second reference axis 262.

Advantageously, it is preferable that at least one of the path-length changing members 231-234 is configured to rotate the focus plane of the first image around the first reference axis 264, and at least one of the path-length changing members 231-234 is configured to rotate the focus plane of the first image around the second reference axis 262. This arrangement enables a single imaging sensor 120 to be used while multiple directions (provided by focus-plane tilting in the directions along the first reference axis 264 and along the second reference axis 262) for achieving focusing.

Figure 4:
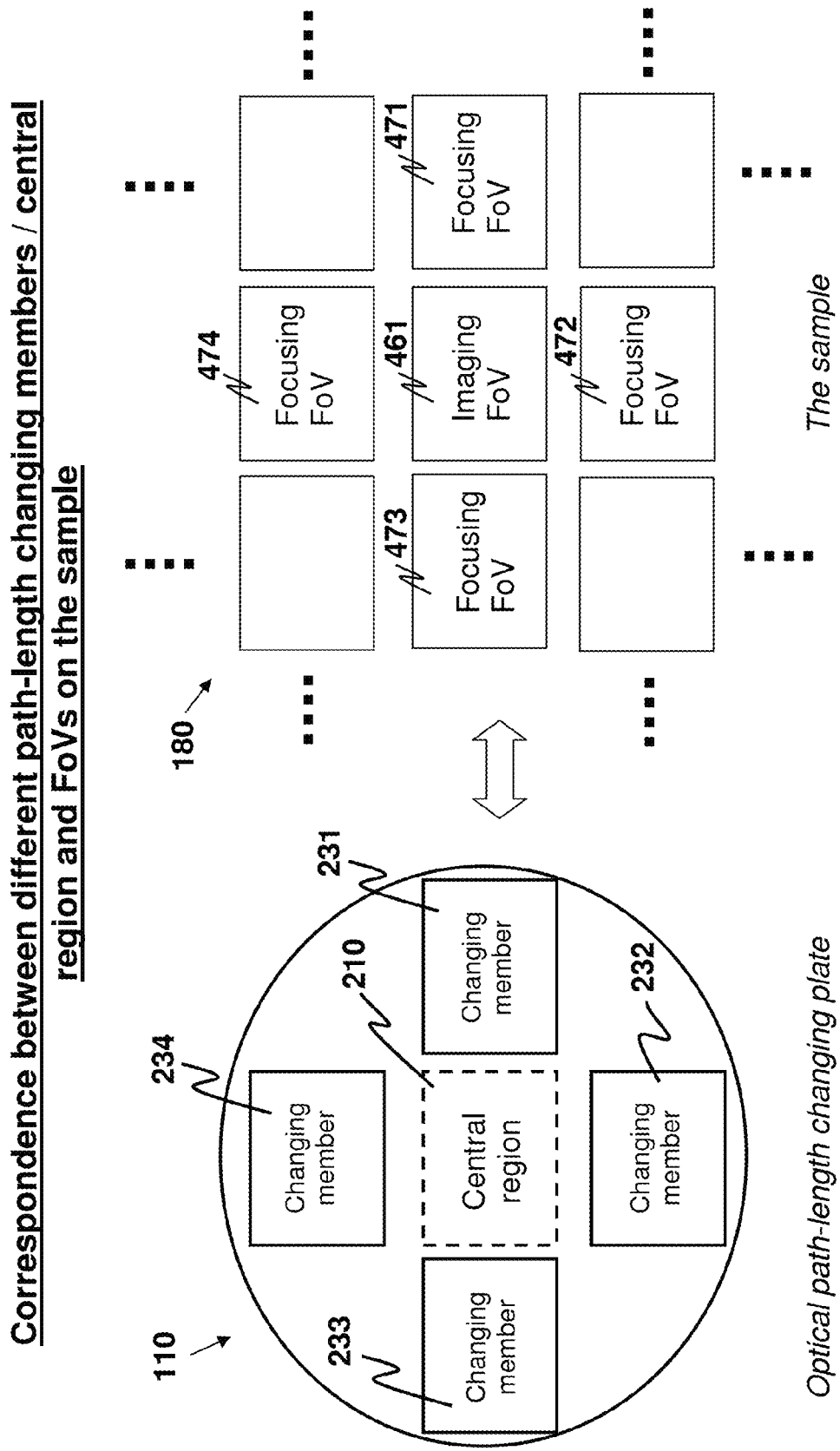
FIG. 4 shows that different FoVs are received by different sections (the central region and different path-length changing members) of the optical path-length changing plate.

FIG. 4 describes the correspondence between different elements (the central region 210 and the path-length changing members 231-234) of the plate 110 and different FoVs on the sample 180. The different FoVs include an imaging FoV 461 and a plurality of focusing FoVs 471-474. An image appeared on the imaging FoV 461 is intended to be brought into focus and to be imaged, while the predictive-focusing apparatus 190 is intended to predict an amount of optical adjustment required for focusing an image in at least one of the focusing FoVs 471-474. The plate 110 is further configured as follows. The central region 210 and all the path-length changing members 231-234 are positioned on the plate 110 and configured such that: an image appeared on a first FoV, where the first FoV is one of the FoVs on the sample 180, is received by the central region 210, indicating that the first FoV is intended to be imaged so that the first FoV corresponds to the imaging FoV 461; and an image appeared on a second FoV adjacent to the first FoV on the sample 180 is received by the light receiving surface of one of the path-length changing members 231-234 so that the second FoV corresponds to one of the focusing FoVs 471-474. It leads to the following advantage. When the image appeared on the first FoV is captured by the imaging sensor 120 for imaging, it is allowable that the image appeared on the second FoV after passing through the plate 110 is substantially simultaneously captured by the imaging sensor 120 for predicting an amount of optical adjustment required to be made for achieving focusing on the image appeared on the second FoV.

Note that the imaging sensor 120 or the primary sensor 160 can be used to capture an image appeared on the imaging FoV 461. However, it is preferable and highly desirable that the primary sensor 160, instead of the imaging sensor 120, is used to capture the image of the imaging FoV 461 due to one or more advantages as follows. The one or more advantages include one or more of: higher imaging resolution; controllable imaging resolution; higher light sensitivity; lower imaging noise level; and higher spectral sensitivity over a dedicated range of wavelengths.

Figure 9:
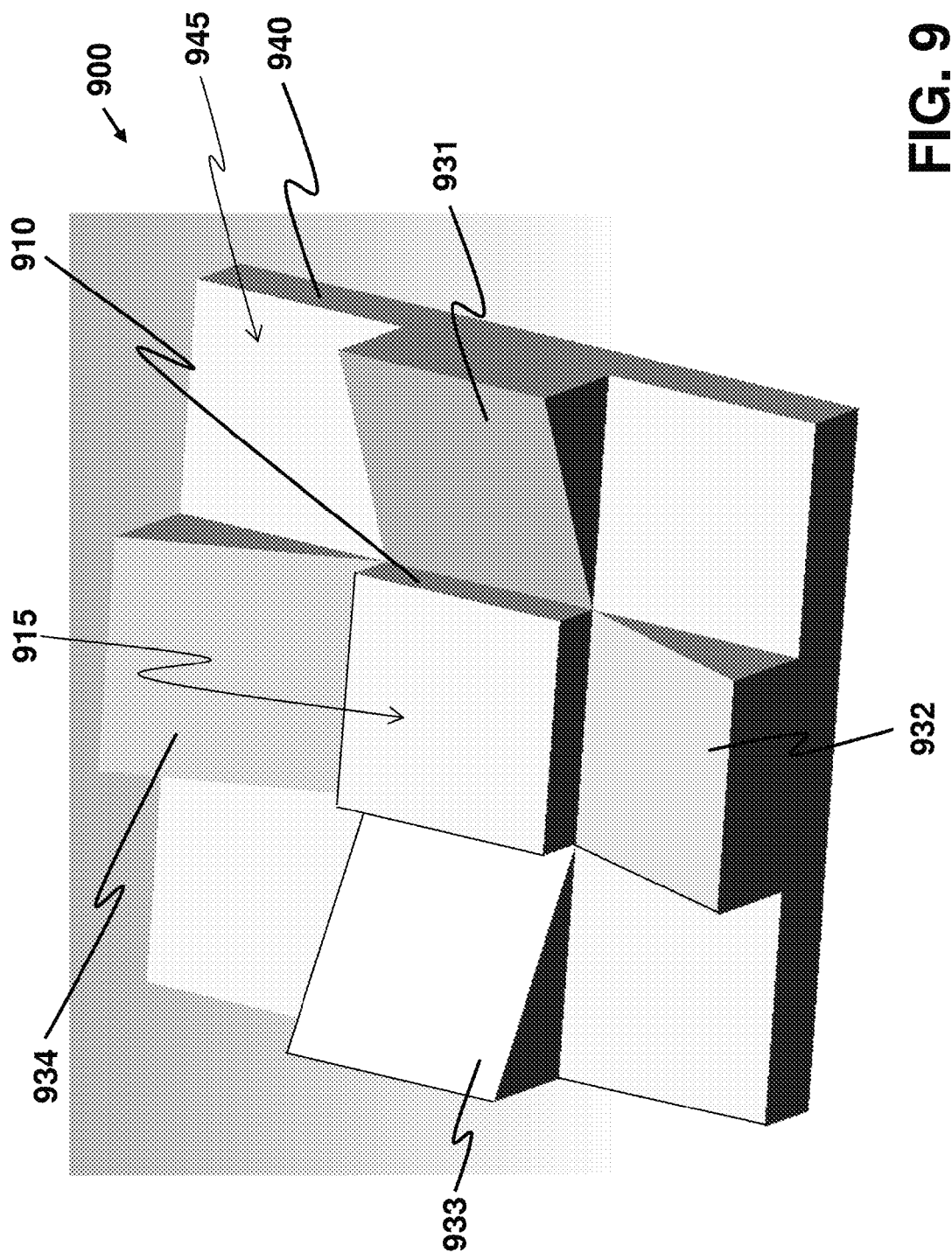
FIG. 9 provides an example of an optical path-length changing plate in which a central region thereof is thickened.

In case the imaging sensor 120 is intended for capturing the image appeared on the imaging FoV 461, preferably the central region 210 is configured to provide a substantially constant change in optical path length across the central region 210 when second plural light beams travel into the central region 210 in a direction along the optical axis 105. A desired result of such arrangement regarding the central region 210 is that a second image formed by the second plural light beams has a focus plane that is optically adjustable to coincide with the imaging sensor 120. It thereby allows the second image to be in-focus captured by the imaging sensor 120 for imaging. Such optical adjustment may be accomplished by the actuator 135. It is also noticed that the path-length changing members 231-234 provide changes in optical path length so that a focal plane of an image passing through any of these changing members 231-234 is shifted away from the plate 110. To address occurrence of this shift, preferably the central region 210 of the plate 110 is thickened so that the image appeared on the imaging FoV 461 has a corresponding focal plane within a focus detection range of the focusing FoVs 471-474. An example of such plate is depicted in FIG. 9. An optical path-length changing plate 900 has a plurality of path-length changing members 931-934 and a central region 910 that is thickened. The central region 910 is thickened by having a top surface 915 of the central region 910 to be elevated from a surface 945 of a bulk 940 of the plate 900, where the top surface 915 is configured to receive light for the central region 910.

In another option, the primary sensor 160 is used for imaging the image appeared on the imaging FoV 461. It follows that the imaging sensor 120 is only used for capturing the images appeared on each of the path-length changing members 231-234. In this case, the imaging sensor 120 may be implemented by including a plurality of component image-sensing members. Each of the component image-sensing members is configured to capture an image after passing through one of the path-length changing members. It is not necessary to allocate a component image-sensing member for capturing the image appeared on the imaging FoV 461.

Figure 5A:
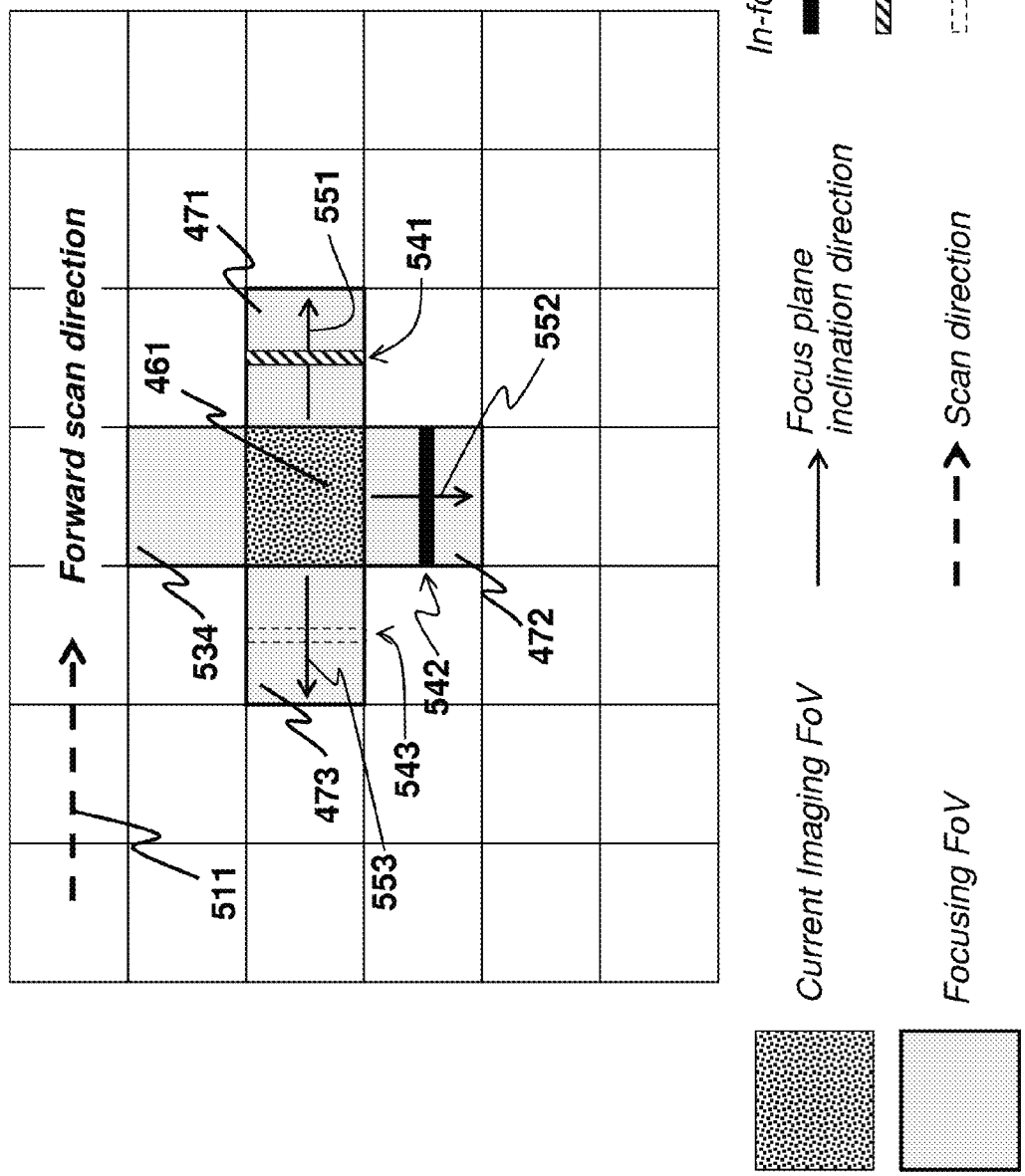
FIG. 5a provides an example to illustrate how predictive focusing, rechecking of the focusing prediction and assessment of the focusing performance are achievable when the sample is raster-scanned in a forward scan direction.
Figure 5B:
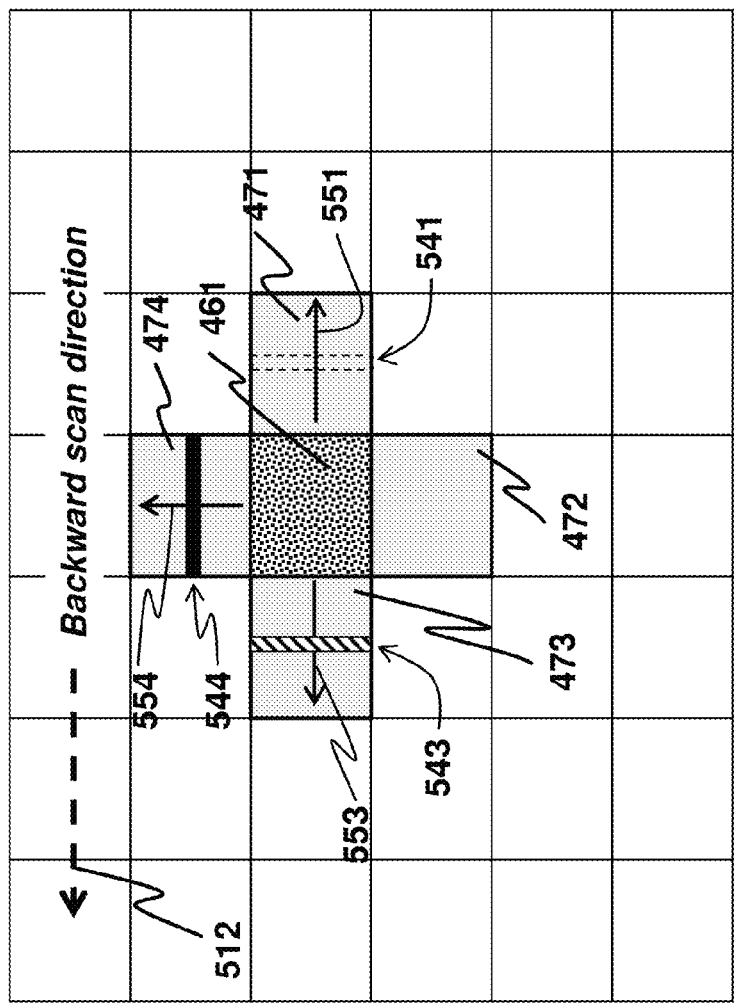
FIG. 5b provides an example to illustrate how predictive focusing, rechecking of the focusing prediction and assessment of the focusing performance are achievable when the sample is raster-scanned in a backward scan direction.
Figure 5B:
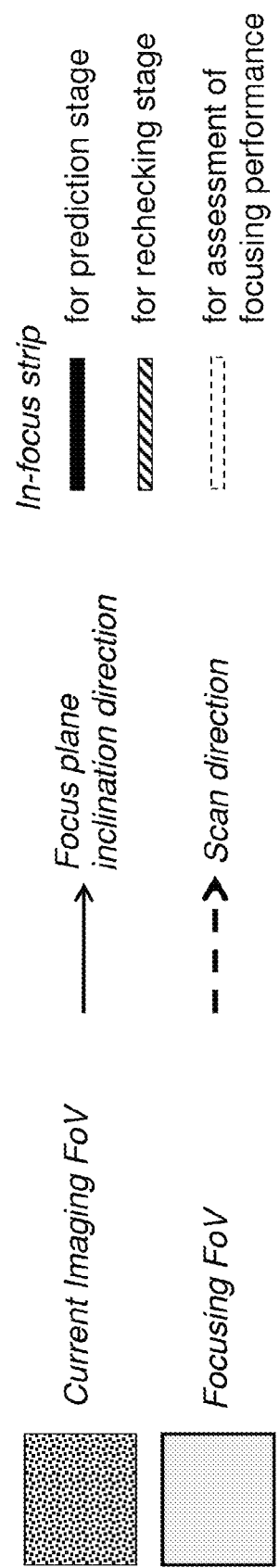

In a preferable configuration of the predictive-focusing apparatus, predictive focusing comprises two stages: a prediction stage and a rechecking stage. Optionally, a stage for assessing the focusing performance may be included after an imaging FoV is imaged. FIG. 5a gives an example illustrating how focus prediction, rechecking of the focusing prediction and assessing of the focusing performance are achievable when the sample 180 is raster-scanned in a forward scan direction 511. In FIG. 5b, another similar example is given for raster-scanning in a backward scan direction 512.

As used herein, the forward scan direction 511 is defined as a scan direction such that FoVs of the sample 180 when placed on the specimen holder 185 are scanned from left to right and top to bottom. Similarly, the backward scan direction 512 is defined herein in the specification and in the appended claims as a scan direction such that FoVs of the sample 180 when placed on the specimen holder 185 are scanned from right to left and bottom to top. As used herein, a certain first FoV being "ahead of" a certain second FoV indicates a positional relationship between the first FoV and the second FoV on the sample, and has an interpretation in the sense that the second FoV is focused and imaged (as an imaging FoV defined above) before the first FoV is focused and imaged in raster scanning of the sample in the forward scan direction. Similarly, it is defined herein that a certain first FoV being "behind" a certain second FoV indicates a positional relationship between the first FoV and the second FoV on the sample, and has an interpretation in the sense that the first FoV is focused and imaged (as an imaging FoV) before the second FoV is focused and imaged in raster scanning of the sample in the forward scan direction. Note that the forward scan direction, instead of the backward scan direction, is referenced in interpreting the meanings of "ahead of" and "behind."

Refer to FIG. 5a. A plurality of FoVs is raster-scanned in the forward scan direction 511. A FoV that is currently focused and imaged is the imaging FoV 461 (regarded as a current imaging FoV). The focusing FoVs 471-474 are adjacent to the current imaging FoV 461.

The prediction stage is illustrated as follows. It is noticed that the focusing FoV 472 is one row ahead of the current imaging FoV 461, so that when the current imaging FoV 461 is in-focus imaged, an image on the focusing FoV 472 has not been focused and imaged. While the current imaging FoV 461 is imaged, the image on the focusing FoV 472 is allowed to pass through the path-length changing member 232 of the plate 110 so that this image's focal plane is tilted with respect to the imaging sensor 120 for the focusing purpose. The focal plane is tilted in a direction 552, and the tilting is provided by a rotation of the focal plane around a first rotation axis that is either the first reference axis 264 or the second reference axis 262. A first in-focus strip 542 is thereby obtained. As used herein, an in-focus strip is a strip substantially having the highest sharpness over an image captured by the imaging sensor 120 for a focusing FoV. The first in-focus strip 542 is used to predict an amount of optical adjustment that will be required to bring the image on the focusing FoV 472 to be in-focused when the holder driver 172 advances one row of the sample 180 and positions the sample 180 such that the original focusing FoV 472 becomes a current imaging FoV for imaging.

The rechecking stage is illustrated as follows. Before the original focusing FoV 472 becomes a current imaging FoV for imaging, due to raster scanning in the forward scan direction 511, it is necessary that this original focusing FoV 472 first becomes the focusing FoV 471. An image appeared on the focusing FoV 471 passes through the path-length changing member 231 of the plate 110 so that this image's focal plane is titled in a direction 551. This tilting is provided by a rotation of the focal plane around a second rotation axis that is orthogonal to the first rotation axis. It gives rise to a second in-focus strip 541, having a direction along the second rotation axis. As the required amount of optical adjustment for achieving focusing has already been predicted in the prediction stage, the second in-focus strip 541 is used to recheck this predicted amount whether focusing is or is not acceptably achievable, and to fine-tune this predicted amount through analyzing the second in-focus strip 541, which has the direction 551 orthogonal to the direction 552. Using a pair of orthogonal directions 551, 552 for the first in-focus strip 542 and the second in-focus strip 541 has the following advantage. As the first in-focus strip 542 is a narrow strip, there is a likelihood that this strip 542 is lack of contrasting details necessary for making focusing prediction accurately. This situation happens when, for example, the focusing FoV 472 is empty over a particular area on which the first in-focus strip 541 is obtained. On the other hand, the likelihood that both the first in-focus strip 542 and the second in-focus strip 541 are lack of contrasting details is significantly much lower. By having a rechecking stage, the focusing-prediction accuracy and robustness can therefore be enhanced.

The functions performed by the focusing FoVs 472, 471 can be equivalently illustrated as follows. When an image appeared on the current imaging FoV 461 passes through the central region 210, the following two actions are also taken. First, an amount of optical adjustment required to achieve focusing an image appeared on the focusing FoV 472, which is one row ahead of the current imaging FoV 461, is predicted via analyzing the first in-focus strip 542 obtained by capturing such image after passing through the path-length changing member 232. Second, an already predicted amount of optical adjustment required to achieve focusing an image appeared on the focusing FoV 231, which is one FoV ahead of, i.e. immediately ahead of, the current imaging FoV 461, is rechecked via analyzing the second in-focus strip 541 obtained by capturing such image after passing through the path-length changing member 231. The second in-focus strip 541 is orthogonal in direction to the first in-focus strip 542.

The optional assessing stage is illustrated as follows. A focusing FoV 473, which is one FoV behind the current imaging FoV 461, has an image appeared thereon being already captured before the current imaging FoV 461 is imaged. When the image appeared on the current imaging FoV 461 passes through the central region 210, accuracy of already-performed focusing on the image appeared on the focusing FoV 473 can be assessed by analyzing an additional in-focus strip 543 obtained by capturing such image (appeared on the focusing FoV 473) after passing through the path-length changing member 233. In an event that the accuracy of the already-performed focusing is below an acceptable value, the focus controller 130 may instruct the holder driver 172 to move one FoV back so that the original focusing FoV 473 becomes a current imaging FoV 461 for re-focusing and re-capturing an image on such current imaging FoV 461.

Refer to FIG. 5b, where raster scanning is done in the backward scan direction 512. The focusing FoV 474 is one row behind the current imaging FoV 461, while the focusing FoV 473 is one FoV behind the current imaging FoV 461. The focusing FoV 474 functions as the focusing FoV 472 in the prediction stage, whereas the focusing FoV 473 functions as the focusing FoV 471 in the rechecking stage. It follows that by including the four path-length changing members 431-434 in the plate 110, the prediction stage and the rechecking stage are accomplishable for both the forward scan direction 511 and the background scan direction 512 in raster scanning of the sample 180.

In one embodiment, as is shown in FIGS. 5a and 5b, a third in-focus strip 544 corresponding to the focusing FoV 474 is substantially in parallel to the first in-focus strip 542, and a fourth in-focus strip 543 corresponding to the focusing FoV 473 is substantially in parallel to the second in-focus strip 541. It follows that a focal plane of an image passing through the path-length changing member 234 is rotated in a direction along the first rotation axis. Similarly, a focal plane of an image passing through the path-length changing member 233 is rotated in a direction along the second rotation axis.

As is shown in FIGS. 4, 5a and 5b, the plate 110 has four path-length changing members 231-234 configured such that any adjacent two of these changing members 231-234 have in-focus strips that are mutually orthogonal. As is disclosed above, this arrangement of the four changing members 231-234 allows predictive focusing to be supported in raster scanning of the sample 180 in both the forward scan direction 511 and the backward scan direction 512. If scanning in the forward scan direction 511 or in the backward scan direction 512 is regarded as scanning in the x-direction, another advantage of the aforementioned arrangement is that predictive focusing is also supported for scanning in the y-direction, i.e. scanning along a column rather than a row in the array of FoVs. Scanning in the y-direction provides an additional option in implementation of the image scanning system 100. For example, scanning in the y-direction may be configured to be a fast-scan option in contrast to a slow-scan option of raster scanning in the forward scan direction 511 or the backward scan direction 512.

Figure 6:
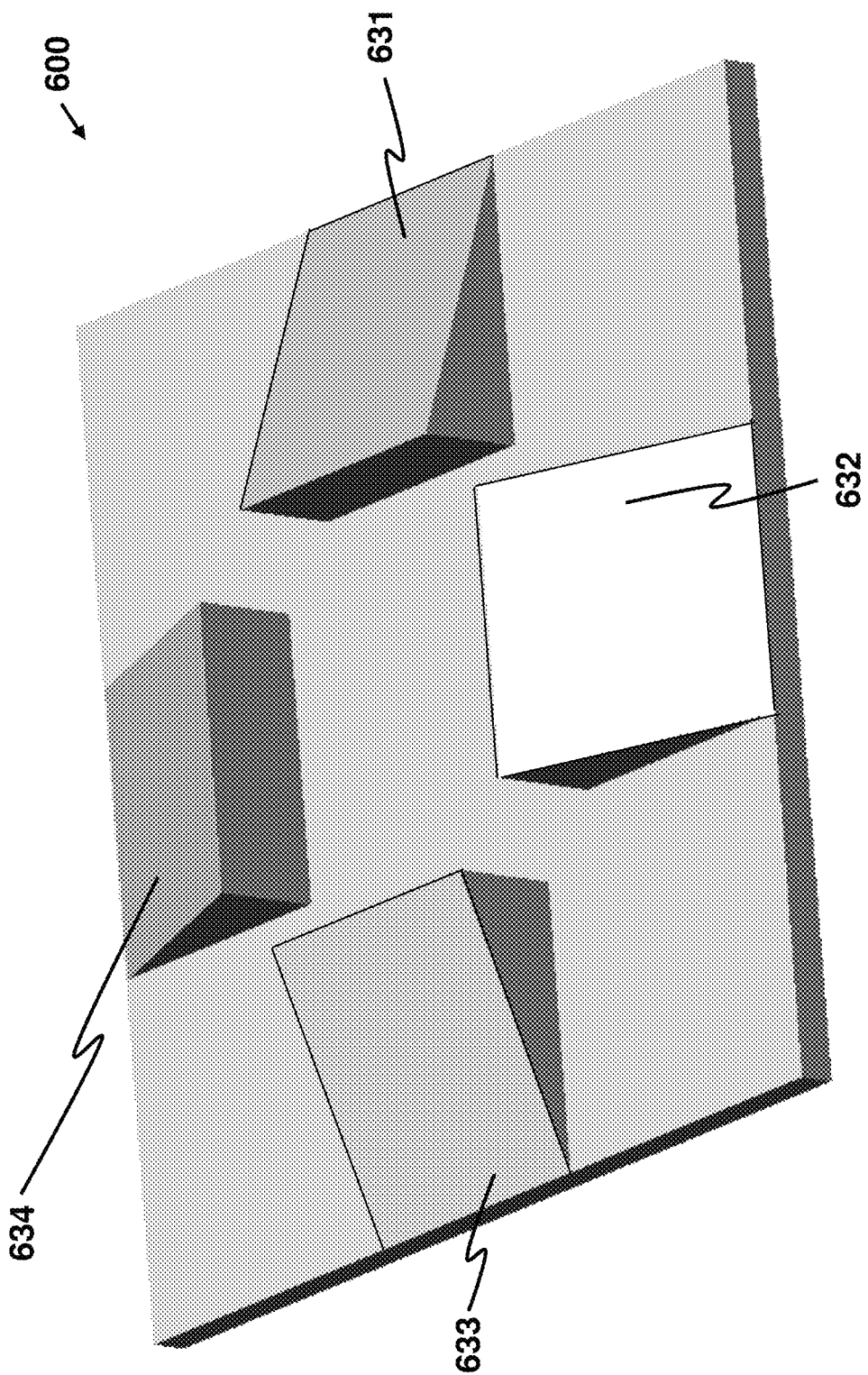
FIG. 6 depicts, in accordance to an embodiment of the present invention, an optical path-length changing plate that provides a plurality of path-length changing members each of which inclines the focus plane with a particular direction, where the path-length changing members are oriented differently from the changing members shown in FIG. 2.
Figure 10:
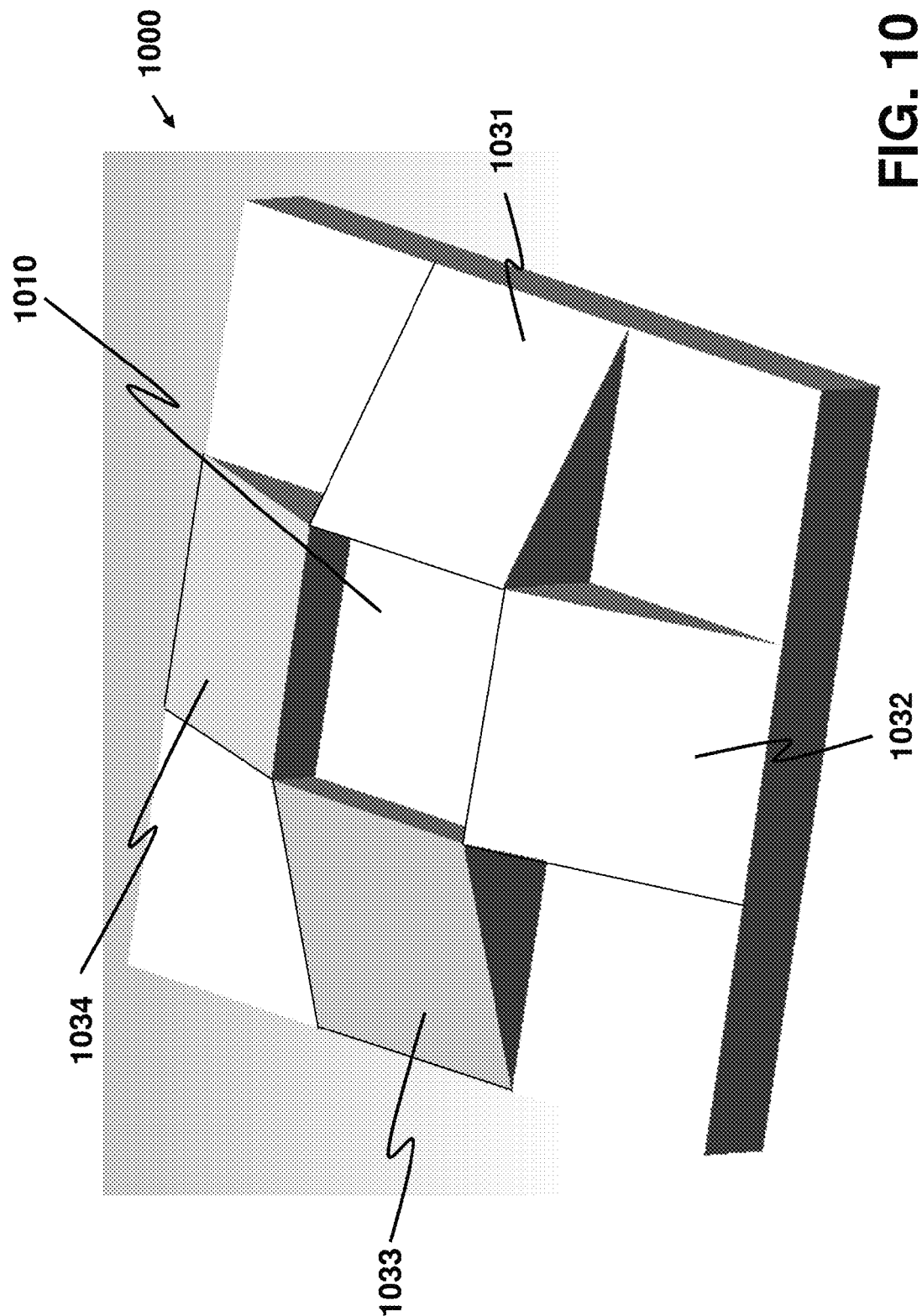
FIG. 10 provides another example of an optical path-length changing plate in which a central region thereof is thickened.

FIG. 6 provides another example of the optical path-length changing plate different from the plate shown in FIG. 2. An optical path-length changing plate 600 comprises a plurality of path-length changing members 631-634. The changing members 631-634 are oriented differently from the changing members 231-234 of the plate 110 shown in FIG. 2. FIG. 10 provides yet another example of the optical path-length changing plate. A plate 1000 has a plurality of path-length changing members 1031-1034 and a central region 1010 that is thickened.

Figure 7:
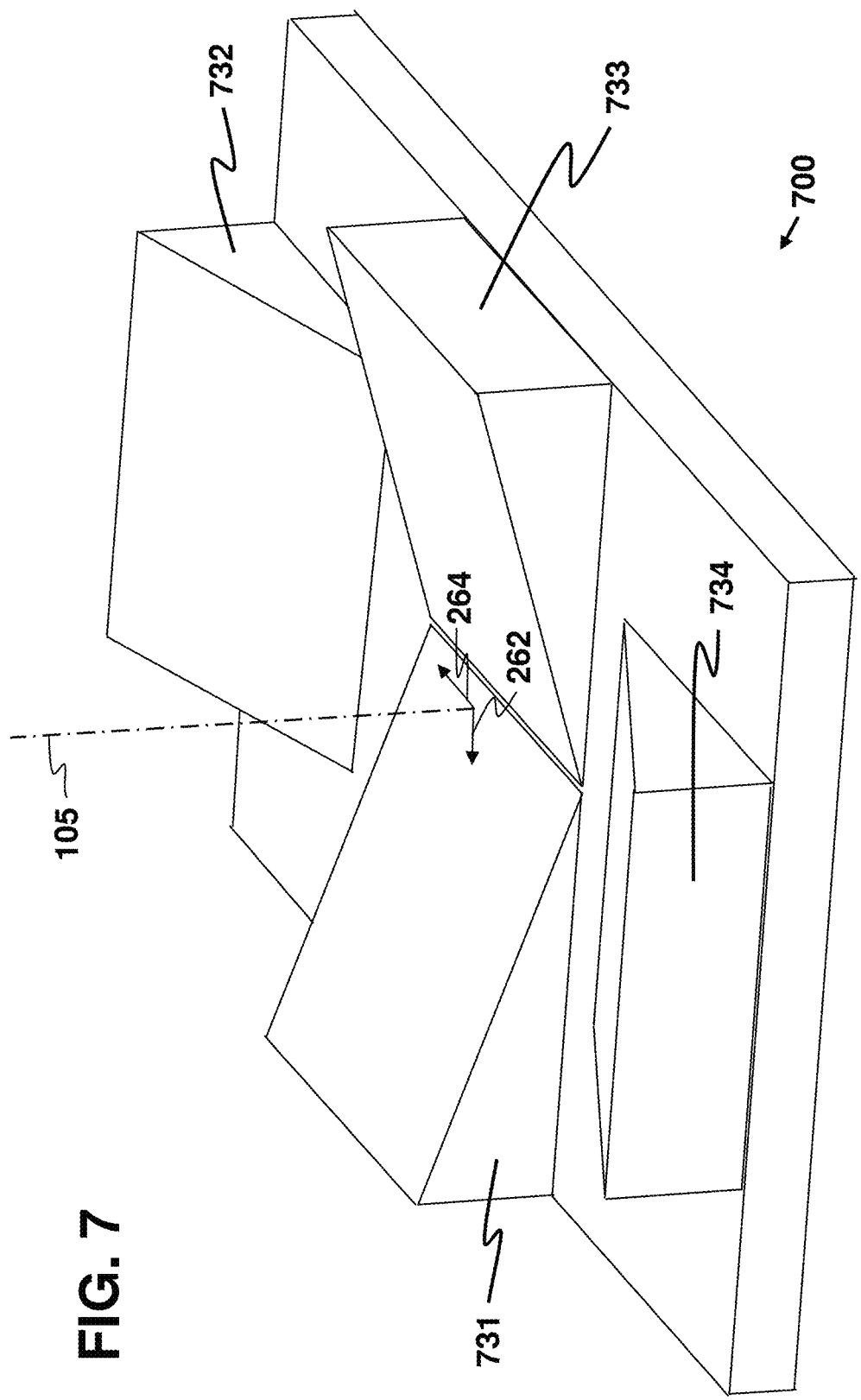
FIG. 7 depicts, in accordance with another embodiment of the present invention, an optical path-length changing plate not having a central region.

FIG. 7 provides another configuration of the optical path-length changing plate. This configuration is different from the plate 110 shown in FIG. 2 in that the central region 210 originally in the plate 110 is substantially removed in this configuration. The advantage of this configuration is that the imaging sensor 120 can be made smaller to thereby reduce a cost of implementing the image scanning system 100.

Figure 8:
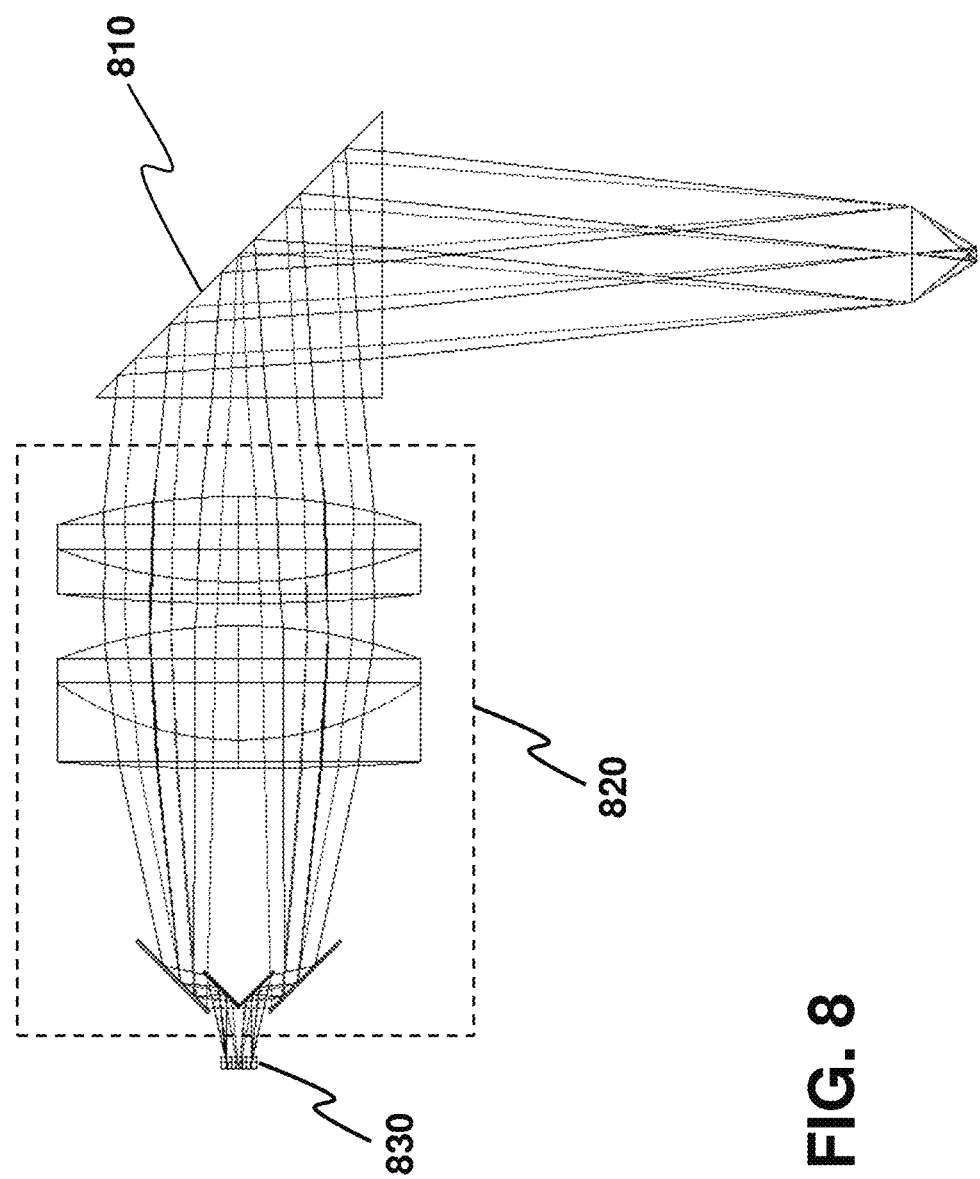
FIG. 8 depicts an example of an optical device that is used with the path-length changing plate of FIG. 7 for removing an image appeared on a current imaging FoV from incoming light beams before presenting these light beams to the plate.

Refer to FIG. 7. An optical path-length changing plate 700 comprises a plurality of path-length changing members 731-734. The changing members 731-734 are closely packed so that a central region is substantially absent on the plate 700. The optical axis 105, the first reference axis 264 and the second reference axis 262 are also shown in FIG. 7 for reference. The changing members 731, 732, 733, 734 of the plate 700 correspond to the changing members 231, 232, 233, 234 of the plate 110, respectively. An image scanning system having a predictive-focusing apparatus that employs the plate 700 is operated substantially similar to operating the image scanning system 100 employing the plate 110 of FIG. 2 except that an image appeared on a current imaging FoV 461 does not pass through any central region but is imaged or captured by the primary sensor 160. However, due to an absence of a central region in the plate 700, an optical device is required to process light beams that carry images of the current imaging FoV 461 and of the focusing FoV 471-474 before presenting these light beams to the plate 700. In particular, the optical device is configured to substantially remove the image appeared on the current imaging FoV 461 from these light beams. FIG. 8 depicts an example of this optical device. An optical device 820, which is a combination of lenses and reflectors, is used to process light beams reflected from a light splitter 810 (corresponding to the light splitter 106 in FIG. 1). The processed light beams are presented to an optical path-length changing plate 830 that is configured as the plate 700.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. An apparatus for achieving predictive focusing in an image scanning system, the image scanning system being configured to scan a sample by partitioning the sample into an array of fields of view (FoVs) where focusing is individually applied to each of the FoVs and where the array of FoVs, arranged as rows of FoVs, is scanned in a raster-scanning manner, the apparatus comprising:
an optical path-length changing plate comprising a plurality of path-length changing members on the plate, the plate being positioned substantially perpendicular to an optical axis of the image scanning system whereby an individual light beam traveling through the plate in a direction along the optical axis experiences a change in optical path length introduced by the plate; and
an imaging sensor positioned substantially perpendicular to the optical axis for sensing an image formed by light beams after such light beams travel through the plate;
wherein:
the path-length changing members are positioned substantially away from the plate's center so as to form a central region of the plate;
each of the path-length changing members has a light receiving surface and is configured to provide a substantially non-uniform change in optical path length across the light receiving surface when first plural light beams travel into the light receiving surface in a direction along the optical axis, such that a focus plane of a first image formed by the first plural light beams is rotated with an inclination angle relative to the imaging sensor, the focus plane of the first image being rotated around either a first reference axis orthogonal to the optical axis or a second reference axis orthogonal to both the optical axis and the first reference axis, thereby allowing a first projected image formed by the first plural light beams and projected onto the imaging sensor to be used for predicting an amount of optical adjustment required to achieve focusing; and
the central region and the path-length changing members are positioned on the plate and configured such that an image appeared on a first FoV, the first FoV being one of the FoVs on the sample, is received by the central region, and such that an image appeared on a second FoV adjacent to the first FoV on the sample is received by the light receiving surface of one of the path-length changing members, whereby when the image appeared on the first FoV is captured for imaging, it is allowable that the image appeared on the second FoV after passing through the plate is substantially simultaneously captured by the imaging sensor for predicting an amount of optical adjustment required to be made for achieving focusing on the image appeared on the second FoV.

2. The apparatus of claim 1, wherein:
at least one of the path-length changing members is configured to rotate the focus plane of the first image around the first reference axis; and
at least one of the path-length changing members is configured to rotate the focus plane of the first image around the second reference axis.

3. The apparatus of claim 1, wherein the apparatus further comprises a focus controller for predicting the amount of optical adjustment required to achieve focusing according to the first projected image captured by the imaging sensor, and wherein the focusing mechanism includes an actuator for moving an objective lens in order to drive the sample to be in-focused by adjusting a distance between the objective lens and the sample.

4. The apparatus of claim 1, wherein:
a first one of the path-length changing members, regarded as a first path-length changing member, is configured to rotate the focus plane of the first image around a first rotation axis that is either the first reference axis or the second reference axis, whereby a first in-focus strip of the first image as captured by the imaging sensor for predicting a required amount of optical adjustment has a direction along the first rotation axis;
a second one of the path-length changing members, regarded as a second path-length changing member, is configured to rotate the focus plane of the first image around a second rotation axis orthogonal to the first rotation axis, whereby a second in-focus strip of the first image as captured by the imaging sensor for predicting a required amount of optical adjustment has a direction along the second rotation axis;

the first path-length changing member is positioned adjacent to the central region such that a third FoV, an image appeared on which is received by the first path-length changing member, is one row ahead of the first FoV;

the second path-length changing member is positioned adjacent to the central region such that a fourth FoV, an image appeared on which is received by the second path-length changing member, is one FoV ahead of the first FoV;

whereby when an image appeared on a current imaging FoV passes through the central region, an amount of optical adjustment required to achieve focusing an image appeared on a FoV one row ahead of the current imaging FoV is predicted via analyzing the first in-focus strip obtained by capturing such image after passing through the first path-length changing member, and an already predicted amount of optical adjustment required to achieve focusing an image appeared on a FoV immediately ahead of the current imaging FoV is rechecked via analyzing the second in-focus strip obtained by capturing such image after passing through the second path-length changing member, the second in-focus strip being orthogonal in direction to the first in-focus strip.

5. The apparatus of claim 4, wherein:

a third one of the path-length changing members, regarded as a third path-length changing member, is configured to rotate the focus plane of the first image around a third rotation axis that is either the first reference axis or the second reference axis;

a fourth one of the path-length changing members, regarded as a fourth path-length changing member, is configured to rotate the focus plane of the first image around a fourth rotation axis orthogonal to the third rotation axis;

the third path-length changing member is positioned adjacent to the central region such that a fifth FoV, an image appeared on which is received by the third path-length changing member, is one row behind the first FoV;

the fourth path-length changing member is positioned adjacent to the central region such that a sixth FoV, an image appeared on which is received by the fourth path-length changing member, is one FoV behind the first FoV;

whereby prediction and rechecking are accomplishable when the sample is raster-scanned in a forward scan direction as well as when the sample is raster-scanned in a backward scan direction.

6. The apparatus of claim 5, whereby when the image appeared on the current imaging FoV passes through the central region, accuracy of focusing already performed on an image appeared on a FoV immediately behind the current imaging FoV is assessed via analyzing an additional in-focus strip obtained by capturing such image after passing through the fourth path-length changing member.

7. The apparatus of claim 5, wherein the third rotation axis is the first rotation axis, and the fourth rotation axis is the second rotation axis.

8. The apparatus of claim 1, wherein the central region is configured to provide a substantially constant change in optical path length across the central region when second plural light beams travel into the central region in a direction along the optical axis, such that a second image formed by the second plural light beams has a focus plane that is optically adjustable by a focusing mechanism of the apparatus to coincide with the imaging sensor, thereby allowing the second image to be in-focus captured by the imaging sensor.

9. An image scanning system configured to scan a sample by partitioning the sample into an array of fields of view (FoVs) where focusing is individually applied to each of the FoVs and where the array of FoVs, arranged as rows of FoVs, is scanned in a raster-scanning manner, the image scanning system comprising:

the apparatus for achieving predictive focusing in the image scanning system according to claim 1; and a primary sensor for imaging the image appeared on the first FoV.

10. The image scanning system of claim 9, wherein the primary sensor has one or more advantages over the imaging sensor in capturing the image appeared on the first FoV, said one or more advantages including one or more of higher imaging resolution, controllable imaging resolution, higher light sensitivity, lower imaging noise level, and higher spectral sensitivity over a dedicated range of wavelengths.

11. An image scanning system configured to scan a sample by partitioning the sample into an array of fields of view (FoVs) where focusing is individually applied to each of the FoVs and where the array of FoVs, arranged as rows of FoVs, is scanned in a raster-scanning manner, the image scanning system comprising:

the apparatus for achieving predictive focusing in the image scanning system according to claim 4; and a primary sensor for imaging the image appeared on the first FoV.

12. The image scanning system of claim 11, wherein the primary sensor has one or more advantages over the imaging sensor in capturing the image appeared on the first FoV, said one or more advantages including one or more of higher imaging resolution, controllable imaging resolution, higher light sensitivity, lower imaging noise level, and higher spectral sensitivity over a dedicated range of wavelengths.

13. An image scanning system configured to scan a sample by partitioning the sample into an array of fields of view (FoVs) where focusing is individually applied to each of the FoVs and where the array of FoVs, arranged as rows of FoVs, is scanned in a raster-scanning manner, the image scanning system comprising:

the apparatus for achieving predictive focusing in the image scanning system according to claim 5; and a primary sensor for imaging the image appeared on the first FoV.

14. An image scanning system configured to scan a sample by partitioning the sample into an array of fields of view (FoVs) where focusing is individually applied to each of the FoVs and where the array of FoVs, arranged as rows of FoVs, is scanned in a raster-scanning manner, the image scanning system being configured to achieve predictive focusing, the image scanning system comprising:

an optical path-length changing plate comprising a plurality of path-length changing members on the plate, the plate being positioned substantially perpendicular to an optical axis of the image scanning system whereby an individual light beam traveling through the plate in a direction along the optical axis experiences a change in optical path length introduced by the plate;

an imaging sensor positioned substantially perpendicular to the optical axis for sensing an image formed by light beams after such light beams travel through the plate; and a primary sensor for imaging an image appeared on one of the FoVs after focusing of said image is accomplished, said one of the FoVs being regarded as a first FoV;

wherein:

each of the path-length changing members has a light receiving surface and is configured to provide a substantially non-uniform change in optical path length across the light receiving surface when first plural light beams travel into the light receiving surface in a direction along the optical axis, such that a focus plane of a first image formed by the first plural light beams is rotated with an inclination angle relative to the imaging sensor, the focus plane of the first image being rotated around either a first reference axis orthogonal to the optical axis or a second reference axis orthogonal to both the optical axis and the first reference axis, thereby allowing a first projected image formed by the first plural light beams and projected onto the imaging sensor to be used for predicting an amount of optical adjustment required to achieve focusing; and the path-length changing members are positioned on the plate and configured such that an image appeared on a second FoV adjacent to the first FoV on the sample is received by the light receiving surface of one of the path-length changing members, whereby when the image appeared on the first FoV is captured by the primary sensor for imaging, it is allowable that the image appeared on the second FoV after passing through the plate is substantially simultaneously captured by the imaging sensor for predicting an amount of optical adjustment required to be made for achieving focusing on the image appeared on the second FoV.

15. The image scanning system of claim 14, wherein:

at least one of the path-length changing members is configured to rotate the focus plane of the first image around the first reference axis; and at least one of the path-length changing members is configured to rotate the focus plane of the first image around the second reference axis.

16. The image scanning system of claim 14, wherein the image scanning system further comprises a focus controller for predicting the amount of optical adjustment required to achieve focusing according to the first projected image captured by the imaging sensor, and wherein the focusing mechanism includes an actuator for moving an objective lens in order to drive the sample to be in-focused by adjusting a distance between the objective lens and the sample.

17. The image scanning system of claim 14, wherein:

a first one of the path-length changing members, regarded as a first path-length changing member, is configured to rotate the focus plane of the first image around a first rotation axis that is either the first reference axis or the second reference axis, whereby a first in-focus strip of the first image as captured by the imaging sensor for predicting a required amount of optical adjustment has a direction along the first rotation axis;

a second one of the path-length changing members, regarded as a second path-length changing member, is configured to rotate the focus plane of the first image around a second rotation axis orthogonal to the first rotation axis, whereby a second in-focus strip of the first image as captured by the imaging sensor for predicting a required amount of optical adjustment has a direction along the second rotation axis;

the first path-length changing member is positioned such that a third FoV, an image appeared on which is received by the first path-length changing member, is one row ahead of the first FoV;

the second path-length changing member is positioned such that a fourth FoV, an image appeared on which is received by the second path-length changing member, is one FoV ahead of the first FoV;

whereby when an image appeared on a current imaging FoV is captured by the primary sensor, an amount of optical adjustment required to achieve focusing an image appeared on a FoV one row ahead of the current imaging FoV is predicted via analyzing the first in-focus strip obtained by capturing such image after passing through the first path-length changing member, and an already predicted amount of optical adjustment required to achieve focusing an image appeared on a FoV immediately ahead of the current imaging FoV is rechecked via analyzing the second in-focus strip obtained by capturing such image after passing through the second path-length changing member, the second in-focus strip being orthogonal in direction to the first in-focus strip.

18. The image scanning system of claim 17, wherein:

a third one of the path-length changing members, regarded as a third path-length changing member, is configured to rotate the focus plane of the first image around a third rotation axis that is either the first reference axis or the second reference axis;

a fourth one of the path-length changing members, regarded as a fourth path-length changing member, is configured to rotate the focus plane of the first image around a fourth rotation axis orthogonal to the third rotation axis;

the third path-length changing member is positioned such that a fifth FoV, an image appeared on which is received by the third path-length changing member, is one row behind the first FoV;

the fourth path-length changing member is positioned such that a sixth FoV, an image appeared on which is received by the fourth path-length changing member, is one FoV behind the first FoV;

whereby prediction and rechecking are accomplishable when the sample is raster-scanned in a forward scan direction as well as when the sample is raster-scanned in a backward scan direction.

19. The image scanning system of claim 18, whereby when the image appeared on the current imaging FoV is captured by the primary sensor, accuracy of focusing already performed on an image appeared on a FoV immediately behind the current imaging FoV is assessed via analyzing an additional in-focus strip obtained by capturing such image after passing through the fourth path-length changing member.

20. The image scanning system of claim 18, wherein the third rotation axis is the first rotation axis, and the fourth rotation axis is the second rotation axis.

* * * * *